(12) United States Patent
Murai et al.

(10) Patent No.: US 9,486,869 B2
(45) Date of Patent: Nov. 8, 2016

(54) POWER SUPPLY DEVICE FOR ELECTRIC DISCHARGE MACHINING

(71) Applicant: FANUC CORPORATION, Minamitsuru-gun, Yamanashi (JP)

(72) Inventors: Masao Murai, Yamanashi (JP); Tomoyuki Furuta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 371 days.

(21) Appl. No.: 14/139,264

(22) Filed: Dec. 23, 2013

(65) Prior Publication Data
US 2014/0190941 A1    Jul. 10, 2014

(30) Foreign Application Priority Data

Jan. 8, 2013    (JP) .................................. 2013-001300

(51) Int. Cl.
*B23H 1/00*    (2006.01)
*B23H 1/02*    (2006.01)
*B23H 7/16*    (2006.01)

(52) U.S. Cl.
CPC ................ *B23H 1/02* (2013.01); *B23H 1/024* (2013.01); *B23H 7/16* (2013.01)

(58) Field of Classification Search
CPC ........... B23H 7/101; B23H 7/02; B23H 7/04
USPC .................. 219/68, 69.1, 69.11, 69.12, 69.13
See application file for complete search history.

(56) References Cited

U.S. PATENT DOCUMENTS

| RE29,589 E | * | 3/1978 | Inoue ...................... B23H 1/024 |
| | | | 219/69.13 |
| 6,169,261 B1 | * | 1/2001 | Li ........................... B23H 1/022 |
| | | | 219/69.13 |
| 8,680,422 B2 | * | 3/2014 | Yoshida ................... B23H 7/04 |
| | | | 219/69.12 |
| 2011/0000889 A1 | | 1/2011 | Hashimoto et al. |
| 2012/0048833 A1 | | 3/2012 | Kawahara et al. |
| 2012/0228270 A1 | | 9/2012 | Murai et al. |

FOREIGN PATENT DOCUMENTS

| CN | 1772425 A | 5/2006 |
| CN | 101318242 A | 12/2008 |
| EP | 2223764 A2 | 9/2010 |
| EP | 2269755 A2 | 1/2011 |

(Continued)

OTHER PUBLICATIONS

Office Action mailed Jun. 3, 2014, corresponds to Japanese patent application No. 2013-001300.

(Continued)

*Primary Examiner* — Dana Ross
*Assistant Examiner* — Ayub Maye
(74) *Attorney, Agent, or Firm* — Hauptman Ham, LLP

(57) ABSTRACT

In a power supply device for electric discharge machining, the polarity of the voltage to be applied is determined on the basis of a result of determination whether the machining gap is in open state or not, an average value of voltages applied across the machining gap voltage during machining, and the number of successive open states with the same polarity. This eliminates the need to significantly vary the voltages to be applied from positive to negative and from negative to positive, thereby reducing the output energy required by the machining power supply.

10 Claims, 11 Drawing Sheets

(56) References Cited

FOREIGN PATENT DOCUMENTS

| | | | |
|---|---|---|---|
| JP | 61-260915 A | | 11/1986 |
| JP | 2010194693 A | | 9/2010 |
| JP | 2010280046 A | * | 12/2010 |
| JP | 201245662 A | | 3/2012 |
| JP | 2012161914 A | | 8/2012 |
| JP | 2012183610 A | | 9/2012 |

OTHER PUBLICATIONS

Office Action mailed Jun. 19, 2015, corresponding to Chinese patent application No. 201410007208.6.

Extended European Search Report issued Sep. 26, 2014, corresponding to European patent application No. 13195224.4.

* cited by examiner

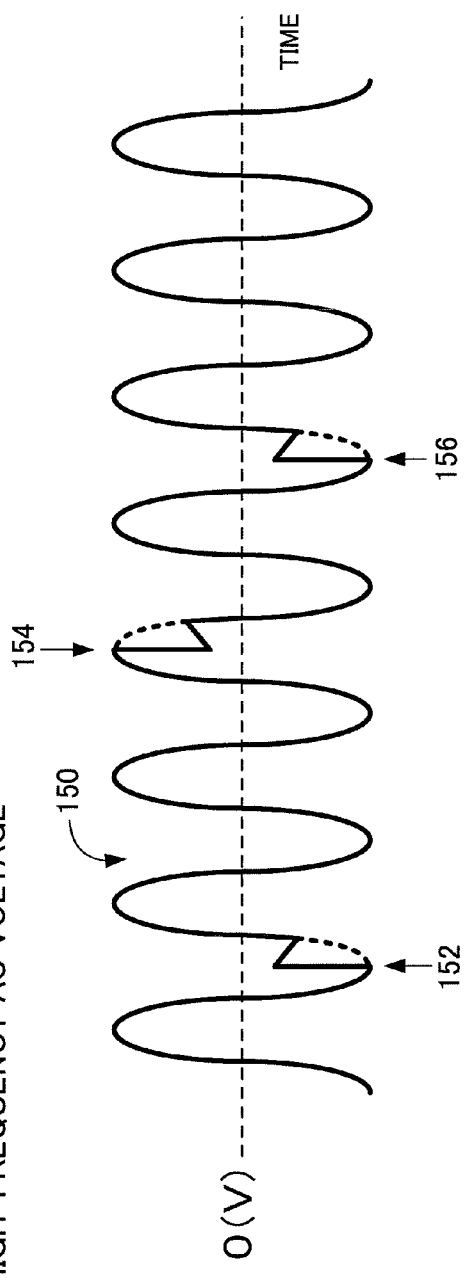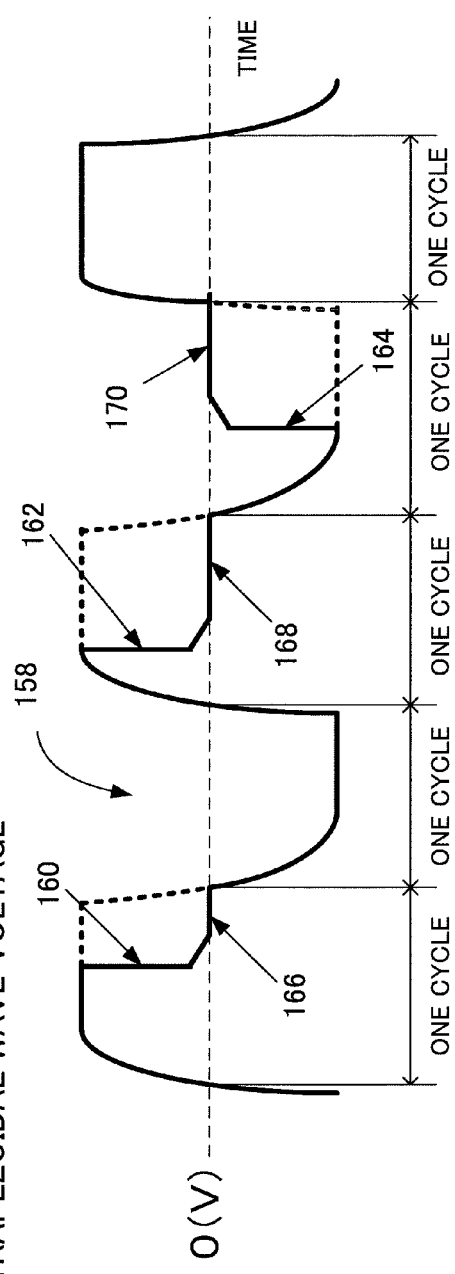
FIG. 2A HIGH-FREQUENCY AC VOLTAGE
FIG. 2B TRAPEZOIDAL WAVE VOLTAGE

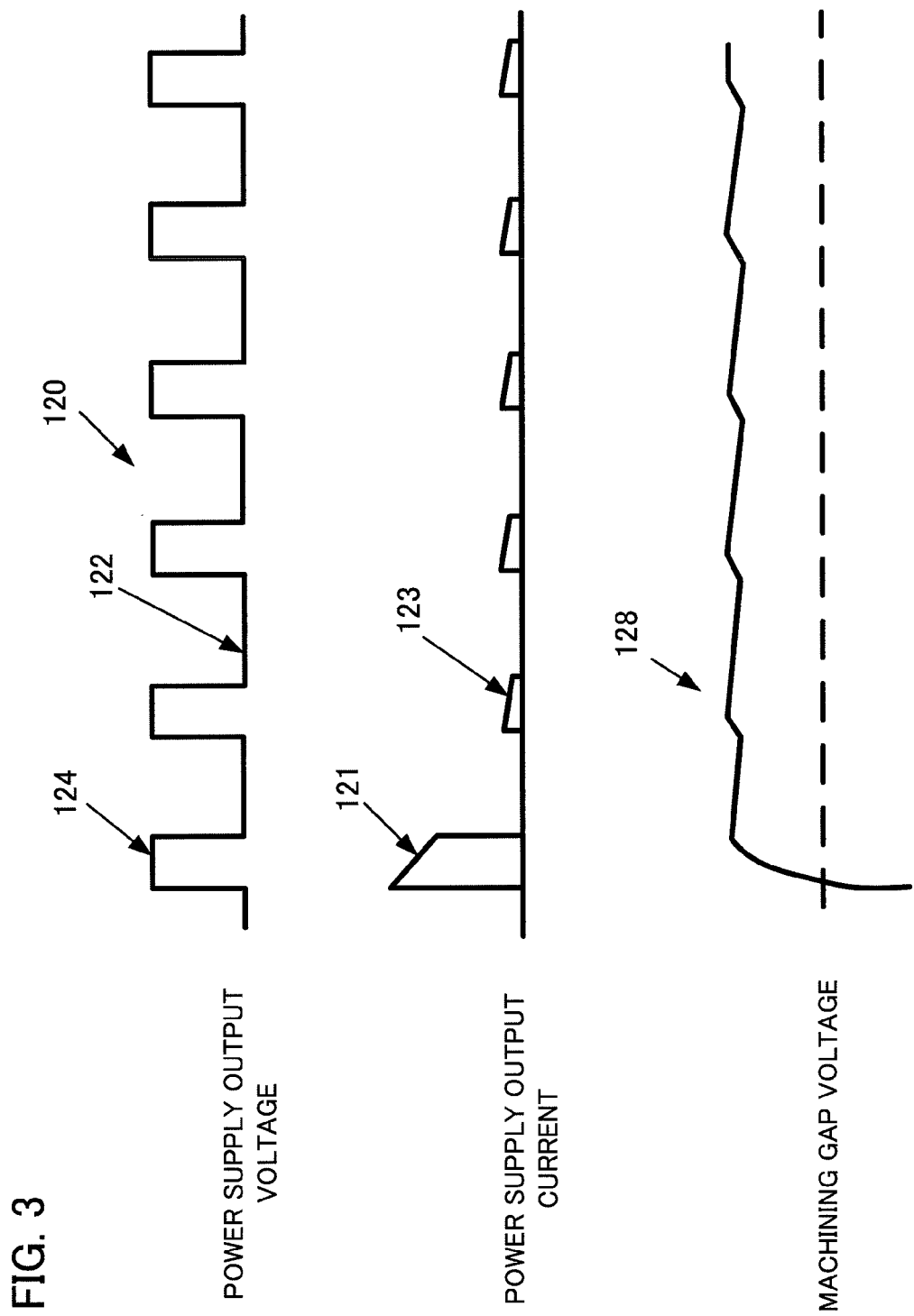

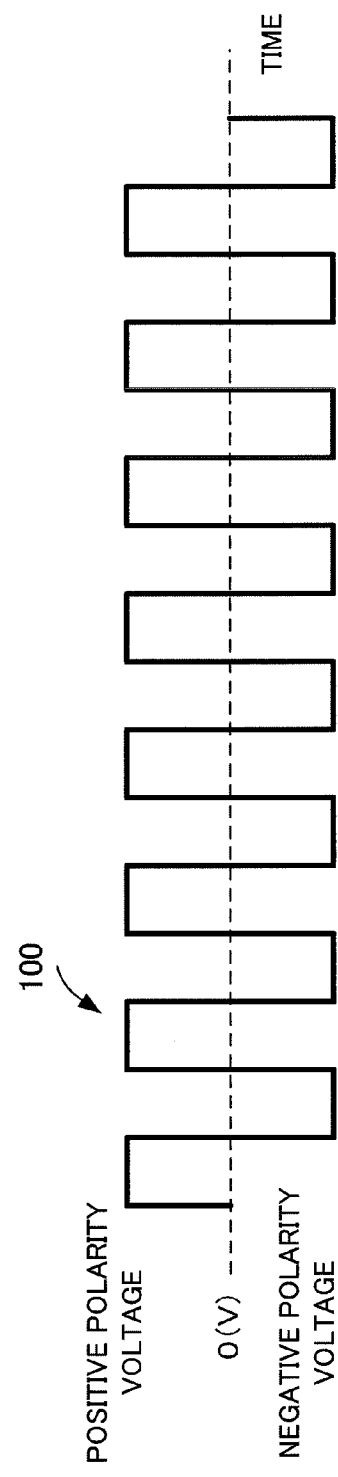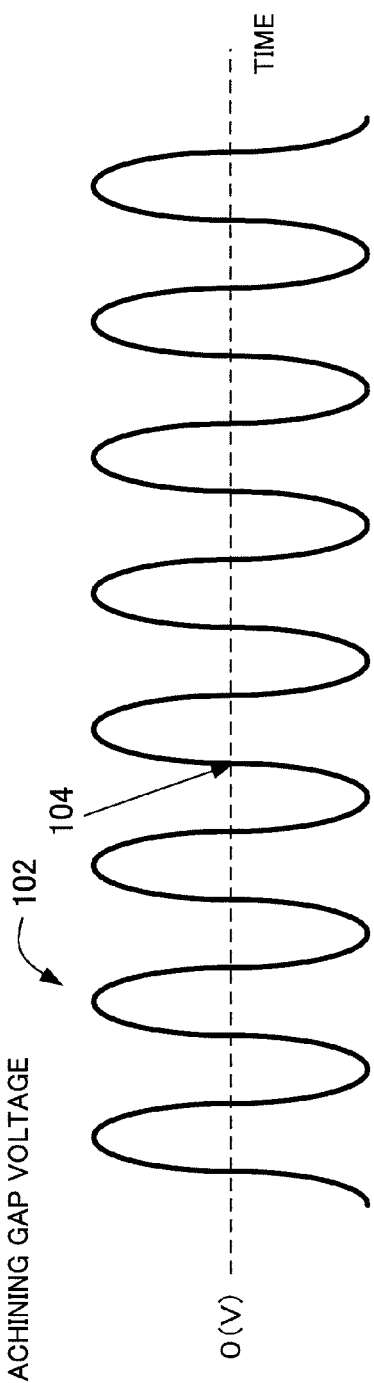
FIG. 10A POWER SUPPLY OUTPUT VOLTAGE
FIG. 10B MACHINING GAP VOLTAGE

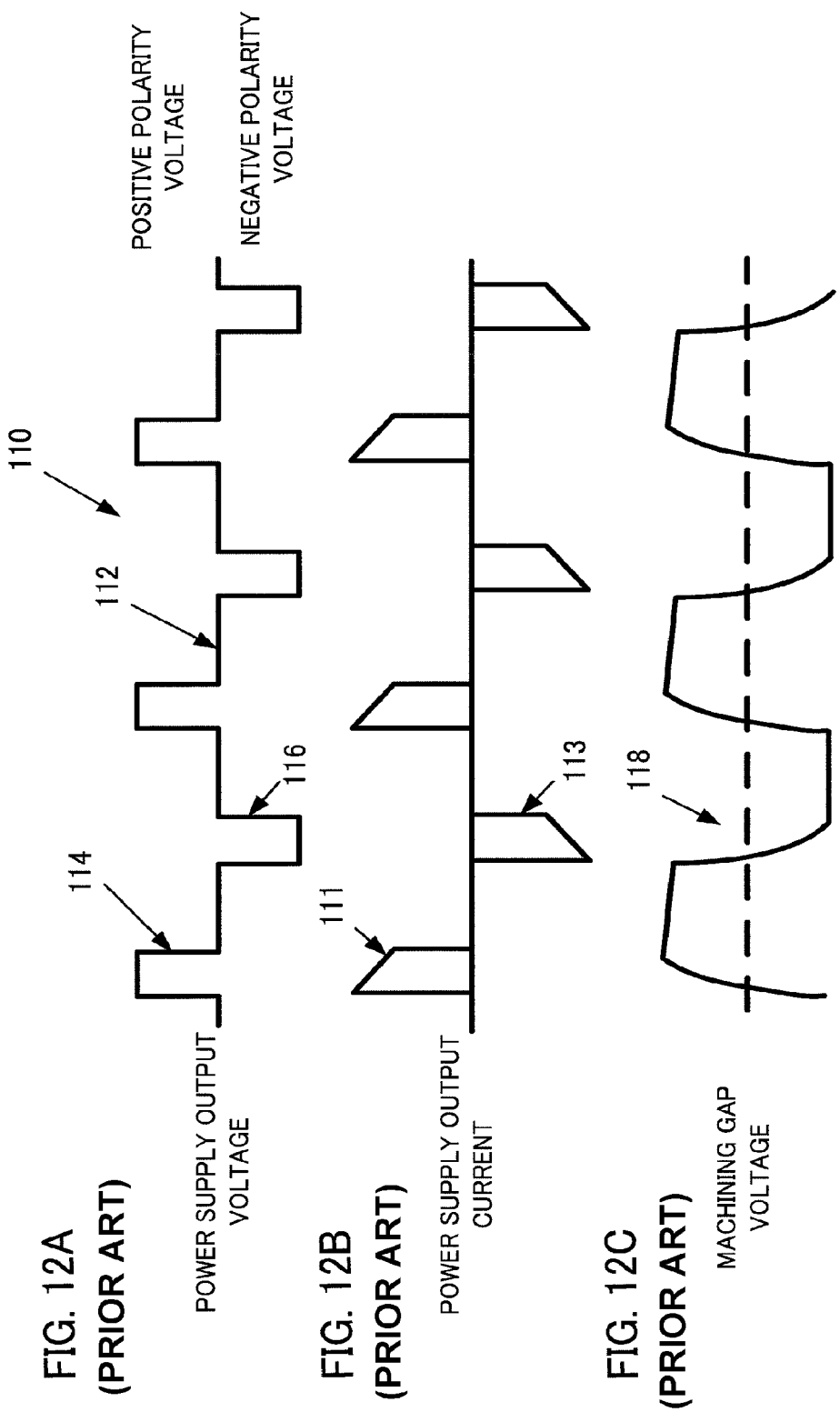

POWER SUPPLY DEVICE FOR ELECTRIC DISCHARGE MACHINING

RELATED APPLICATIONS

The present application claims priority to Japanese Application Number 2013-001300, filed Jan. 8, 2013, the disclosure of which is hereby incorporated by reference herein in its entirety.

BACKGROUND OF THE INVENTION

1. Field of the Invention

The present invention generally relates to a power supply device for electric discharge machining, and in particular to a power supply device for finish machining.

2. Description of the Related Art

In electric discharge machining, arc discharges are generated by applying voltages between an electrode and a workpiece in a machining fluid. The heat generated by these electric discharges melts the workpiece while rapidly heating the machining fluid, causing its vaporization and explosion that blows off the molten portion of the workpiece. Machining progresses by repeating this process at a high frequency. Since the machined surface is formed by a collection of small craters produced by electric discharges, the size of each crater determines the surface roughness.

In wire electric discharge machining, which is a kind of electric discharge machining, it is generally known that electric discharge of short duration is repeated at a high frequency by applying a high-frequency AC voltage 102, which is a power supply output voltage 100, across a machining gap between a wire electrode and a workpiece to achieve micromachining, as shown in FIGS. 10A and 10B. FIG. 10A shows an exemplary high-frequency AC voltage 100 that is generated by the power supply in a wire electric discharge machine. Rectangular wave voltages generated by the power supply are transmitted through a coaxial cable or the like from the power supply to the machining gap and applied in the sinusoidal form of blunt waveforms as shown in FIG. 10B across the machining gap.

Japanese Patent Application Laid-Open No. 61-260915, for example, discloses that a machined surface with a surface roughness of 1 μm Rmax or lower can be obtained by applying high-frequency AC voltages in the range of 1-5 MHz. Japanese Patent Application Laid-Open No. 2010-194693 discloses a machining technique, in which positive and negative voltages are applied, as shown in FIG. 12A, across the machining gap between a wire electrode and a workpiece with a quiescent period equal to or longer than individual voltage application periods provided between individual voltage applications so as to obtain trapezoidal wave voltages.

The technique disclosed in Japanese Patent Application Laid-Open No. 61-260915, however, apparently has the following problems:

(1) Degradation in Straightness Accuracy

If high-frequency AC voltages are used in wire electric discharge machining, the wire electrode bends due to electrostatic attraction between the wire electrode and the workpiece, because voltages are continuously applied across the machining gap, as shown in FIG. 10B. This degrades the straightness accuracy of machining, because the amount of machining increases in the central part of the sheet thickness of the workpiece, resulting in a barrel-like form.

(2) Degradation in Roughness of the Machined Surface

When machining is performed using an AC voltage, electric discharges are theoretically interrupted at every half cycle of the voltage, i.e., at zero crossing points 104 of the discharge current, as shown in FIG. 10B, because the voltages are reversed from positive to negative or from negative to positive over time. At higher AC frequencies, individual electric discharge arcs are not sufficiently extinguished. If electric discharges occur immediately after voltage applications, the electric discharges tend to occur repeatedly at the same place. If electric discharges continue at a high frequency, the resultant surface roughness would become worse than that obtained by AC half-wave electric discharges. Since the surface roughness tends to vary with the density of electric discharges, streaks may be produced on the machined surface.

(3) Difficulty in Determining the Machining State

In electric discharge machining, the machining state is typically determined by measuring an average voltage applied across the machining gap in order to control the electrode feeding speed and to change the machining conditions. With high-frequency AC voltages at several MHz or higher, however, measurement errors increase because a rectifier circuit for obtaining the average voltage does not respond. At high frequencies, resonance phenomena often occur between the machining power supply and the machining gap. If the electric discharge gap length, sheet thickness, the machining fluid flowing state, or the like changes, electric constants of the machining gap change, which inevitably causes the machining voltage to vary. This makes it more difficult to determine the machining state from the average voltage. This is a bottleneck in improving the machining accuracy, because it is difficult to perform feedback control responsive to the machining state, so that the electrode is fed at a constant speed in the finishing region, for example.

As a solution to these problems, the above-mentioned Japanese Patent Application Laid-Open No. 2010-194693 discloses a machining technique using a trapezoidal wave voltage 118 as shown in FIG. 12C. The trapezoidal wave voltage 118 is formed by applying a power supply output voltage 110 across the machining gap between an electrode and a workpiece with a quiescent period 112 equal to or longer than individual voltage application periods provided between applications of positive voltage 114 and negative voltage 116, as shown in FIG. 12A. FIG. 12B shows a power supply output current which corresponds to the power supply output voltage shown in FIG. 12A, wherein positive currents 111 and negative currents 113 are alternately applied.

In electric discharge machining, multiple machining is typically performed by gradually weakening the intensity of machining pulses in the order of rough machining, intermediate machining, and finish machining until the desired accuracy and surface roughness are achieved. In recent years, in order to reduce the machining period, attempts have been made to reduce the number of machining times by performing part of the intermediate machining using a power supply for finish machining. More specifically, in the prior art, rough machining and intermediate machining are performed until a surface roughness of 3-5 μm Rz is achieved and then machining is performed using a power supply for finish machining several times up to a surface roughness of about 1 μm Rz. In recent years, instead, when a surface roughness of about 10 μm Rz is achieved, machining is performed using a power supply for finish machining to reduce the number of machining times and the machining period.

In this case, the amount of machining per unit time of the power supply for finish machining increases than ever and accordingly the output voltage from the machining power supply increases, which overheats switching elements and other components in the conventional power supply exceeding their rated values and makes them unserviceable. There is the need, therefore, to provide a new power supply that can output a higher current.

FIG. 11 is a schematic block diagram of the bipolar voltage application circuit 10 that is typically used as in Japanese Patent Application Laid-Open Nos. 61-260915 and 2010-194693 mentioned above.

Reference numerals 11 and 12 represent DC power supplies; reference numerals 13 and 14 represent switching elements. Reference numerals 15, 16, and 17 represent a damping resistance, inductance, and a resistance, respectively. Reference numerals 18 and 19 represent a line-to-line capacitance and an electrode, respectively. Reference numerals 20, 21, and 22 represent a workpiece, machining gap stray capacitance, and a leak resistance, respectively. The inductance 16, resistance 17 and line-to-line capacitance 18 represent equivalent components included in the wiring route represented by the feeding cable 24 between the power supply and the machining gap. Reference character Vbb represents a voltage applied across the machining gap between the electrode 19 and the workpiece 20. The switching elements 13, 14 are turned on and off by a control circuit (not shown) and output power supply output voltages shown in FIGS. 10A and 12A, for example.

The inductance 16, resistance 17, line-to-line capacitance 18 of the feeding cable 24 exist in the bipolar voltage application circuit 10 and the machining gap stray capacitance 21 and leak resistance 22 exist in the machining gap between the opposite surfaces of the electrode 19 and the workpiece 20. In rough machining and intermediate machining, a machining current having sharply rising peaks is favorable, so the circuit is configured such that the impedance in the entire circuit becomes as small as possible, which reduces the inductance L and resistance R and increases the line-to-line capacitance C. If the output energy from the power supply is reduced to improve the surface roughness as in the finish machining, the stray capacitance cannot be charged rapidly and the frequency of the high-frequency AC voltages applicable across the machining gap including the line-to-line capacitance is limited to about 200-300 kHz.

SUMMARY OF THE INVENTION

In view of these problems, the power supply device is configured such that 500 kHz or higher frequency AC voltages can be applied for finish machining by designing the circuit so as to switch to a feeding cable having a reduced line-to-line capacitance and reduce the machining gap stray capacitance as far as possible.

In such a circuit for finish machining, if positive and negative voltages are applied across the machining gap with a quiescent period provided between individual voltage applications as disclosed in the above-mentioned Japanese Patent Application Laid-Open No. 2010-194693, charges are first accumulated in the line-to-line capacitance 18 and machining gap stray capacitance 21, which causes the machining gap voltage Vbb to rise. In a subsequent quiescent period in which voltages are not applied, the charges accumulated in the line-to-line capacitance 18 and the machining gap stray capacitance 21 are discharged through the leak resistance 22 and thus the machining gap voltage gradually drops. When the voltage application frequency increases to 500 kHz or more as in the above-mentioned Japanese Patent Application Laid-Open No. 2010-194693, the quiescent period becomes relatively short and the voltage drop during the quiescent period is accordingly reduced and substantially negligible.

If a damping resistance 15 for vibration suppression is inserted into the circuit to suppress vibrations in the transition states between the voltage application periods and the quiescent periods, the machining gap voltage can be shaped into a substantially trapezoidal form as shown in FIG. 12C. A higher resistance value of the damping resistance 15 provides a greater vibration suppression effect but reduces the voltage changing speed, resulting in a blunt waveform.

Here, in a power supply in the prior art, the positive and negative polarities of the voltages to be applied across the machining gap are alternated with a quiescent period in between as shown in FIG. 12A. In this scheme, when electric discharge does not occur, the machining power supply needs to charge the machining gap stray capacitance voltage from −E to +E or from +E to −E, which requires fourfold energy compared with when charging from 0 V to +E or from 0 V to −E.

An object of the present invention is to provide a power supply device for electric discharge machining that minimizes the output current from the power supply for finish machining by applying trapezoidal wave voltages, such that a power supply in the prior art can also be used even in a part of the intermediate machining region.

The power supply device for electric discharge machining according to the present invention includes a voltage applying means for applying both positive and negative voltages across the machining gap between the electrode and the workpiece at intervals of not longer than one microsecond with a quiescent period equal to or longer than each voltage application period provided between individual voltage applications, a machining-gap open-state determining means for determining whether or not the machining gap between the electrode and the workpiece is in open state before individual voltage applications, an average voltage detecting means for detecting an average machining gap voltage during machining, the average machining gap voltage being an average value of the machining gap voltages over a period from a preset reference time to the present time, an open-state counting means for counting the number of successive machining gap open states having the same polarity, and an applied polarity determining means for determining the polarity of the voltage to be applied across the machining gap on the basis of the result of determination by the machining-gap open-state determining means, the average machining gap voltage detected by the average voltage detecting means, and the number of successive machining gap open states counted by the open-state counting means. The voltage of the polarity determined by the applied polarity determining means is applied across the machining gap.

According to the present invention, if electric discharge does not occur, the positive and negative polarities are not alternately switched and the voltage of the same polarity is applied next, unlike in the prior art in which the positive and negative polarities of the voltages to be applied across the machining gap are simply alternated with a quiescent period in between. Since the polarity of the voltage to be applied next is determined on the basis of the result of determination by the machining-gap open-state determining means, the average machining gap voltage, and the number of successive open states with the same polarity, it is possible to reduce wasteful energy that does not contribute directly to machining because, when electric discharge does not occur, the voltage to be applied next need not be charged by switching from −E to +E or from +E to −E.

When the machining gap before voltage application is in open state, the applied polarity determining means compares a preset maximum number of successive open states with the value counted by the open-state counting means. If the value counted by the open-state counting means does not reach the maximum number of successive open states, the applied polarity determining means can determine the application of the same polarity as the last one across the machining gap; if the value counted by the open-state counting means reaches the maximum number of successive open states, the applied polarity determining means can determine the application of the polarity opposite to the last one. Furthermore, if the machining gap is not in open state before voltage application, when the average voltage detecting means detects a positive polarity, the applied polarity determining means can determine the application of the negative polarity as the polarity to be applied next, and when the average voltage detecting means detects a negative polarity, the applied polarity determining means can determine the application of the positive polarity as the polarity to be applied next.

In the embodiment described above, it is only necessary to supplement the amount of machining gap voltage reduced by the leak resistance before voltage application as shown in FIG. 3, because the voltage of the same polarity as the last one is applied until the preset maximum number of successive open states is reached. This significantly reduces the output current from the power supply.

If water or other electrolytic material is used as the machining fluid, successive open states for a long time with the same polarity may cause electrolytic corrosion due to unipolar machining. This electrolytic corrosion or other problems due to unipolar machining can be prevented by forcibly switching the polarity of the applied voltage when the number of applications of voltage of the same polarity reaches a preset number of successive open states.

Furthermore, when electric discharge occurs or the machining gap is short-circuited, i.e., not in open state, the voltage of the polarity opposite to the result of detection by the average voltage detecting means is applied next, so that the average machining gap voltage during machining approaches 0 V and thereby electrolytic corrosion or other problems are prevented.

When the absolute value of the voltage applied across the machining gap between the electrode and the workpiece exceeds the preset maximum voltage, the application of voltages may be inhibited.

When voltages of the same polarity are successively applied across the machining gap, the machining gap voltage may rise stepwise to converge to a final value, not becoming constant. In the above embodiment, however, a maximum absolute value of the voltages applied across the machining gap between the electrode and the workpiece is set in advance and, when this maximum value is exceeded, the application of voltages is inhibited by forcibly turning off the switching elements in the voltage applying means. This can prevent the machining gap voltage to rise stepwise and can thus avoid the situation in which individual waveforms of the voltages applied across the machining gap do not become constant.

If an average value of the output current from the voltage applying means over a period from a preset reference time to the present time during machining exceeds a preset maximum current, the voltage application may be suspended and resumed after a predetermined quiescent period.

In the above embodiment, when the machining current exceeds the preset maximum current, the application of voltages is temporarily stopped, so that machining can be performed always at the rated current and the machining capacity can actually be enhanced.

As described above, the present invention can provide a power supply device for electric discharge machining in which the polarity of the voltage to be applied is determined on the basis of the result of determination by the machining-gap open-state determining means, the average machining gap voltage during machining, and the number of successive open states with the same polarity, so that the polarity switching frequency of the voltages to be applied across the machining gap can be reduced such that electrolytic corrosion does not occur, the output current that does not contribute directly to machining can be reduced, a power supply having a large output current is not required, and the amount of machining can be increased even with a small current.

BRIEF DESCRIPTION OF THE DRAWINGS

These and other objects and features of the present invention will be apparent from the following description of embodiments with reference to the appended drawings, in which:

FIG. 2A illustrates the change in voltage waveform of a high-frequency AC voltage between the machining gap open periods and the electric discharge periods in the prior art;

FIG. 2B illustrates the change in voltage waveform of a trapezoidal wave voltage between the machining gap open periods and the electric discharge periods in the prior art;

FIG. 3 shows the changes in the power supply output voltage, power supply output current, and machining gap voltage in the power supply device for electric discharge machining according to the present invention;

FIG. 10A shows the change in power supply output voltage in the power supply device for electric discharge machining in the prior art;

FIG. 10B shows the change in machining gap voltage in the power supply device for electric discharge machining in the prior art;

FIG. 12A to 12C show the changes in power supply output voltage (FIG. 12A), power supply output current (FIG. 12B), and machining gap voltage (FIG. 12C) in the power supply device for electric discharge machining in the prior art in which positive and negative polarities of the voltages to be applied are alternated with a quiescent period provided between individual voltage applications.

DETAILED DESCRIPTION OF THE PREFERRED EMBODIMENTS

Figure 1:
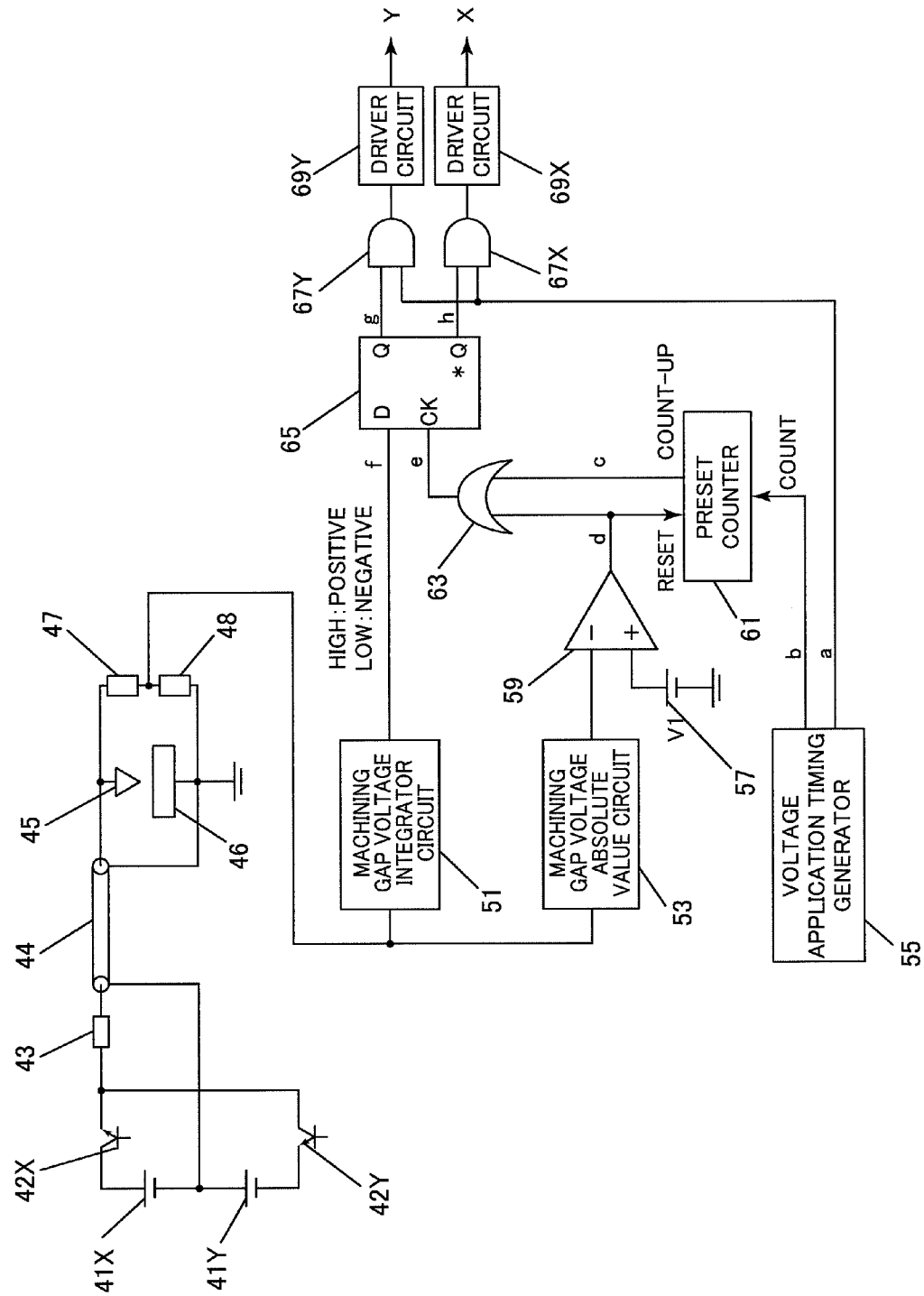
FIG. 1 shows a first embodiment of the power supply device for electric discharge machining according to the present invention.

Referring first to FIG. 1, a first embodiment of the power supply device for electric discharge machining according to the present invention will be described.

In FIG. 1, reference characters 41X, 41Y denote DC power supplies. Reference characters 42X, 42Y denote switching elements that output positive and negative polarity voltages, respectively. Reference numerals 43, 44, 45, and 46 denote a damping resistance, feeding cable, electrode, and a workpiece, respectively. Reference numerals 47, 48 denote voltage dividing resistors. Reference numerals 51, 53, and 55 denote a machining gap voltage integrator circuit, machining gap voltage absolute value circuit, and a voltage application timing generator, respectively. Reference numeral 57 denotes an open-state determining voltage V1. Reference numerals 59, 61, 63, and 65 denote a comparator, preset counter, OR gate, and a flip-flop, respectively. Reference characters 67X, 67Y denote AND gates. Reference characters 69X and 69Y denote first and second driver circuits.

The machining gap voltage between the electrode 45 and the workpiece 46 is divided by a voltage divider including voltage dividing resistors 47, 48 and the divided voltage is input to the machining gap voltage integrator circuit 51 and the machining gap voltage absolute value circuit 53.

When the divided voltage is input, the machining gap voltage integrator circuit 51 determines an average machining gap voltage during machining, which is a value averaged over a period from a preset reference time. If the average machining gap voltage is positive, the machining gap voltage integrator circuit 51 outputs a high-level logic signal. When the average machining gap voltage is negative, the machining gap voltage integrator circuit 51 outputs a low-level logic signal. On the other hand, in the machining gap voltage absolute value circuit 53, when the divided voltage is input, the absolute value of the machining gap voltage is output in the form of an analog voltage. The output analog voltage is input to the comparator 59.

The comparator 59 compares the voltage output from the machining gap voltage absolute value circuit 53 (absolute value of the machining gap voltage) with a preset open-state determining voltage 57 (V1). If the absolute value of the machining gap voltage is equal to or lower than the open-state determining voltage V1, the output from the comparator 59 becomes high.

The voltage application timing generator 55 outputs an ON command a toward the AND gates 67X, 67Y to drive the switching elements in association with preset application periods and quiescent periods. The voltage application timing generator 55 also outputs count pulses b toward the preset counter 61 to count the number of voltage applications.

The preset counter 61 counts the count pulses b sent from the voltage application timing generator 55. When the counted value reaches a preset value, the preset counter 61 outputs a count-up signal c and resets an internal counter value (clears the value to 0). The preset counter 61 has a reset input. When a high-level signal is input through the reset input, the internal counter value is reset (cleared to 0).

The output from the comparator 59 and the count-up signal output from the preset counter 61 are input to the OR gate 63 and a signal resulting from the logical OR of these inputs is output. This logical OR signal from the OR gate 63 is input to the clock input of the flip-flop 65.

The output from the machining gap voltage integrator circuit 51 is input to the flip-flop 65 as D input and the output from the OR gate 63 is input as clock input. At a rising edge of the clock input signal from the OR gate 63, Q and *Q outputs are determined on the basis of the state of the D input. When a clock input signal is input to the flip-flop 65 while its D input is high, the Q output becomes high and the *Q output becomes low. When a clock input signal is input while the D input is low, the Q output becomes low and the *Q output becomes high.

Referring now to FIGS. 2A and 2B, the changes in voltage waveform of a high-frequency AC voltage and a trapezoidal wave voltage between the machining gap open periods and the electric discharge periods in the prior art will be described.

FIG. 2A shows a high-frequency AC voltage 150. FIG. 2B shows a trapezoidal wave voltage 158. In FIG. 2A, reference numerals 152, 154, 156 indicate the points at which electric discharge occurs. Typically, electric discharge often occurs near peak values of the machining gap voltage. Then, the machining gap voltage rapidly drops to an arc voltage as shown in FIG. 2A. Even if electric discharge does not occur, the machining gap voltage drops after reaching its peak. Especially when electric discharge is delayed and occurs after the peak, the difference in voltage is small between the case in which electric discharge has occurred and the case in which electric discharge does not occur.

On the other hand, the voltage waveform of the trapezoidal wave voltage 158 changes between the machining gap open periods and the electric discharge periods as shown in FIG. 2B. If electric discharge does not occur during one cycle period, the voltage is substantially maintained at the peak value as indicated by a dotted line. If electric discharge occurs at the points of occurrence of electric discharge indicated by reference numerals 160, 162, 164, the machining gap voltage drops to the arc voltage and then is kept equal to or lower than the arc voltage during the quiescent periods indicated by reference numerals 166, 168, 170 because the output from the power supply is left turned off.

As can be seen from the large difference between the voltage values indicated by the dotted and solid lines in the voltage waveforms in FIGS. 2A and 2B, the machining gap voltage clearly changes between the presence and absence of electric discharge. Accordingly, the presence or absence of electric discharge can be detected easily by comparing the machining voltages with a predetermined reference voltage. By making use of this, the comparator 59 in the power supply device illustrated in FIG. 1 detects the presence or absence of electric discharge by comparing the absolute value of the machining gap voltage output from the machining gap voltage circuit 53 with the open-state determining voltage V1.

Referring next to the timing chart in FIG. 4, an operation of the power supply device shown in FIG. 1 will be described below.

The "machining gap voltage 71" is the voltage applied across the machining gap between the electrode 45 and the workpiece 46. The "average machining gap voltage 73" is the average value of the machining gap voltage during machining (i.e., an average value of the machining gap voltages measured by the machining gap voltage integrator circuit 51 over a period from a preset reference time). The "counter 75" is a counted value in the preset counter 61. In this embodiment, five values (0, 1, 2, 3, and) are set as the preset values, the counted value 4 is then reset to 0.

Figure 4:
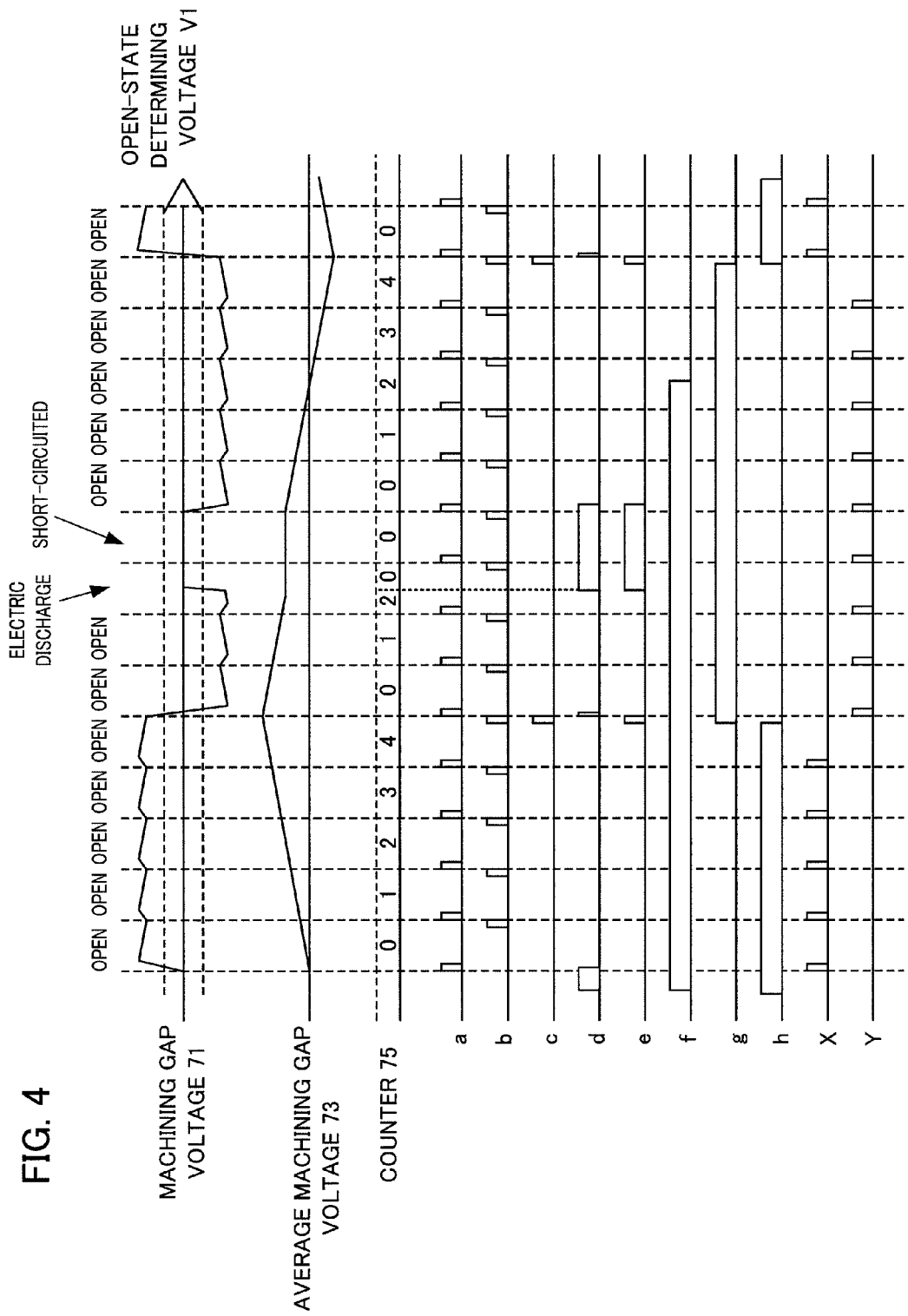
FIG. 4 is a timing chart showing an operation of the power supply device for electric discharge machining in FIG. 1.

Reference characters a, b, c, d, e, f, g, h, X, Y in FIG. 4 represent high or low levels of the signals in the wires denoted by the same reference characters in FIG. 1. More specifically, reference character a represents an ON command signal that is output by the voltage application timing generator 55 at predetermined intervals to drive the switching elements. Reference character b represents the count pulse signal that is output by the voltage application timing generator 55 before the end of each quiescent period. Reference character c represents the count-up signal output by the preset counter 61. Reference character d represents the signal output by the comparator 59. This signal becomes high when the absolute value of the machining gap voltage becomes equal to or lower than the open-state determining voltage V1. Reference character e represents a signal that results from the logical OR of the output from the comparator 59 and the count-up signal from the preset counter 61 and is input to the flip-flop 65 as a clock signal. Reference character f represents the output from the machining gap voltage integrator circuit 51. This signal becomes high when the average machining gap voltage during machining (i.e., an average value of the machining gap voltages over a period from a preset reference time) is positive and becomes low when the average machining gap voltage is negative. Reference character g represents the Q output of the flip-flop 65, while reference character h represents the *Q output of the flip-flop 65.

Initially, the average machining gap voltage 73 is a negative voltage having a small absolute value, so that the signal f becomes low, the Q output g of the flip-flop becomes low, and the *Q output h becomes high. When an operation starts in this state, the voltage application timing generator 55 first outputs an ON command a to turn on the switching elements. Since the output of the comparator 59 is kept high, the output states of the flip-flop 65 remain in the initial state, i.e., the Q output g is low and the *Q output h is high. This causes one (first) driver circuit 69X of the two driver circuits 69X, 69Y to operate and output a drive signal X to the switching element on the positive voltage application side. With this, a positive voltage pulse is applied across the machining gap. If the machining gap open state continues as is, the machining gap voltage gradually drops after the switching element is turned off, so its waveform becomes generally trapezoidal.

Before the end of the quiescent period, the voltage application timing generator 55 outputs a count pulse b to increment the counter value (counter 75) of the preset counter 61 from 0 to 1. Subsequently, the voltage application timing generator 55 outputs again an ON command a to turn on the switching element. Then, if the machining gap is still open, the signals do not change and the application of the positive voltage is repeated and the value of the average machining gap voltage 73 increases until the counted value in the preset counter 61 reaches 4.

Before the end of a quiescent period after the positive polarity voltage is successively applied five times, the voltage application timing generator 55 outputs the count pulse b to increment the counter value to 5, which matches the preset value 5. With this, the preset counter 61 outputs the count-up signal c and clears the value in the internal counter to 0. With the output of the count-up signal c, the clock input e to the flip-flop 65 changes from low to high. Since the signal f to the input D of the flip-flop 65 is high, the Q and *Q outputs are reversed, so that the signal g changes from low to high and the signal h changes from high to low.

In this state, if the voltage application timing generator 55 outputs an ON command a to turn on the next switching element, the other (second) driver circuit 69Y of the two driver circuits 69X, 69Y operates and outputs a drive signal Y to the switching element on the negative voltage application side. This causes the average machining gap voltage 73 that has been rising to start to drop. As in the above case in which the positive voltage pulse is applied across the machining gap, if the machining gap stays open with the negative polarity voltage pulse applied across the machining gap, the counted value (counter 75) in the preset counter 61 increments at every voltage application pause cycle.

Suppose here that an insulation breakdown occurs in the machining gap and electric discharge occurs when the counted value (counter 75) in the preset counter 61 reaches 2 as shown in FIG. 4, for example. This causes the machining gap voltage to rapidly drop from the open-circuit voltage to about an arc voltage, which is equal to or lower than the open-state determining voltage. This changes the output d of the comparator 59 from low to high. The output d (high) from the comparator 59 is input to the reset input of the preset counter 61 to clear the counter value of the preset counter 61 to 0 and at the same time is input to the OR gate 63 to change the clock input e output from the OR gate 63 toward the flip-flop 65 from low to high.

Since the average machining gap voltage is still biased toward the positive polarity as shown in the average machining gap voltage graph in FIG. 4, the signal f to the input D stays high and the output signals Q, *Q from the flip-flop 65 do not change. Accordingly, the next application of voltage is again to the negative polarity side.

Since the output d of the comparator 59 stays high, the counter value of the preset counter 61 is 0 even if the next count pulse b is input to the preset counter 61.

If the machining gap is short-circuited, which is a state in which the machining gap voltage does not rise even if the switching element of the power supply is turned on, the output of the comparator 59 stays high and accordingly the counter value of the preset counter 61 is left cleared to 0.

When the machining gap returns from the short-circuited state to the open state in the next voltage application cycle, the counted value in the preset counter 61 is incremented one by one at the end of each voltage application cycle. When the counted value reaches 5, the preset counter 61 outputs the count-up signal c, which clears the internal counter value to 0. At this time, since the average machining gap voltage is negative as shown in the graph of the average machining gap voltage 73 in FIG. 4, the signal f to the input D of the flip-flop 65 is low and the outputs Q, *Q of the flip-flop 65 are reversed again, so that the Q output signal g changes from high to low and the *Q output signal h changes from low to high. Consequently, the output X of the driver circuit 69X on the positive polarity side becomes effective and the positive voltage is applied across the machining gap.

Figure 5:
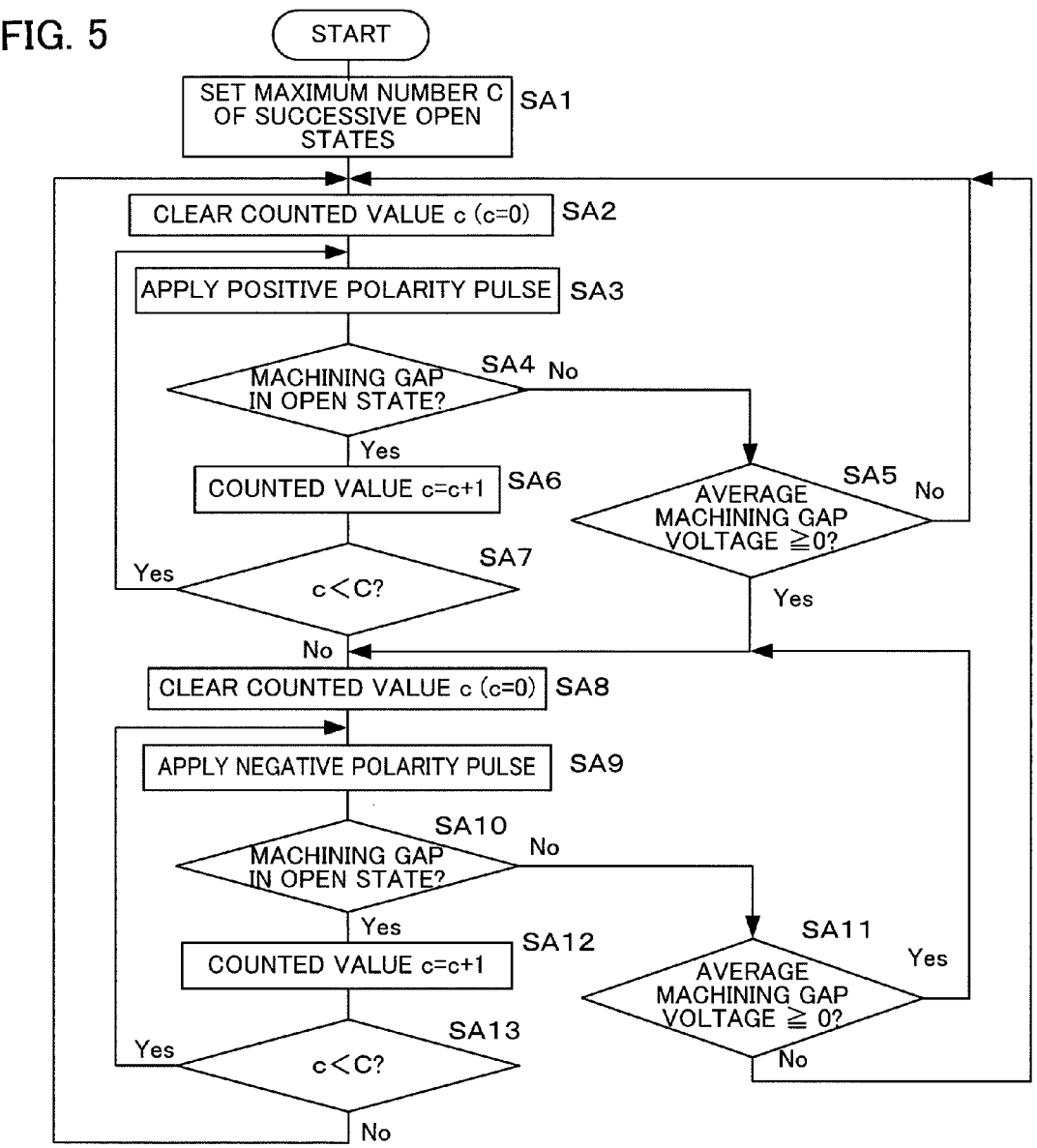
FIG. 5 is a flowchart illustrating an operation of the power supply device for electric discharge machining in FIG. 1.

FIG. 5 is a flowchart illustrating an operation of the power supply device for electric discharge machining in FIG. 1. The operation will now be described step by step.

(Step SA1) The maximum number C (five in this embodiment) of successive open states of the machining gap is set as a preset value in the preset counter 61.

(Step SA2) The counted value c in the preset counter 61 is cleared (reset to 0).

(Step SA3) A positive polarity pulse is applied.

(Step SA4) Whether the machining gap is in open state or not is determined. If the machining gap is in open state (Yes), the process proceeds to Step SA6; if electric discharge occurs or the machining gap is short-circuited, i.e., not in open state (No), the process proceeds to Step SA5.

(Step SA5) Whether the average value of the machining gap voltage over a period from the preset reference time to the present time (i.e., average machining gap voltage) is equal to or higher than 0 is determined. If the average machining gap voltage is equal to or higher than 0 (Yes), the process proceeds to Step SA8; if lower than 0 (No), the process returns to Step SA2.

(Step SA6) The counted value c in the preset counter 61 is incremented by one.

(Step SA7) Whether or not the current counted value c is lower than the maximum number C of successive open states set in Step SA1 is determined. If the counted value c is lower than the maximum number C of successive open states (Yes), the process returns to Step SA3; if equal to or higher than the maximum number C of successive open states (No), the process proceeds to Step SA8.

(Step SA8) The counted value c is cleared (reset to 0).

(Step SA9) A negative polarity pulse is applied.

(Step SA10) Whether the machining gap is in open state or not is determined.

If the machining gap is in open state (Yes), the process proceeds to Step SA12; if electric discharge occurs or the machining gap is short-circuited, i.e., not in open state (No), the process proceeds to Step SA11.

(Step SA11) Whether the average value of the machining gap voltages over a period from the preset reference time to the present time (i.e., machining gap average voltage) is equal to or higher than 0 is determined. If the machining gap average voltage is equal to or higher than 0 (Yes), the process proceeds to Step SA8; if lower than 0 (No), the process returns to Step SA2.

(Step SA12) The counted value c in the preset counter 61 is incremented by one.

(Step SA13) Whether or not the current counted value c is lower than the maximum number C of successive open states set in Step SA1 is determined. If the counted value c is lower than the maximum number C of successive open states (Yes), the process returns to Step SA9; if equal to or higher than the maximum number C of successive open states (No), the process returns to Step SA2.

Figure 6:
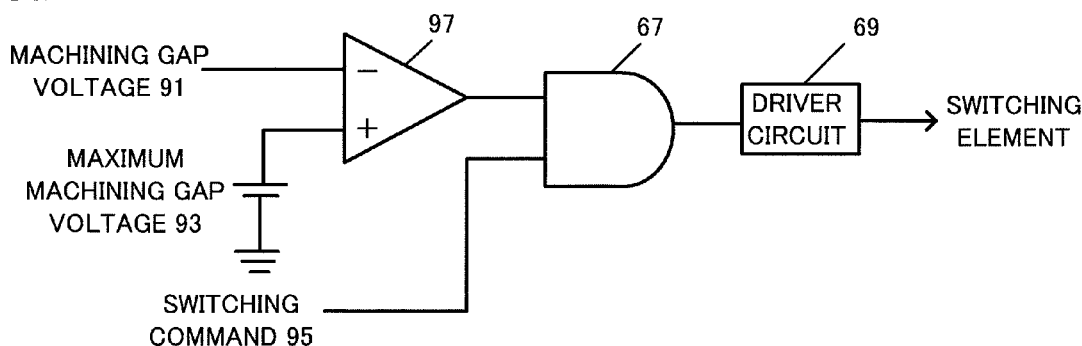
FIG. 6 shows a second embodiment of the power supply device for electric discharge machining according to the present invention.
Figure 7A:
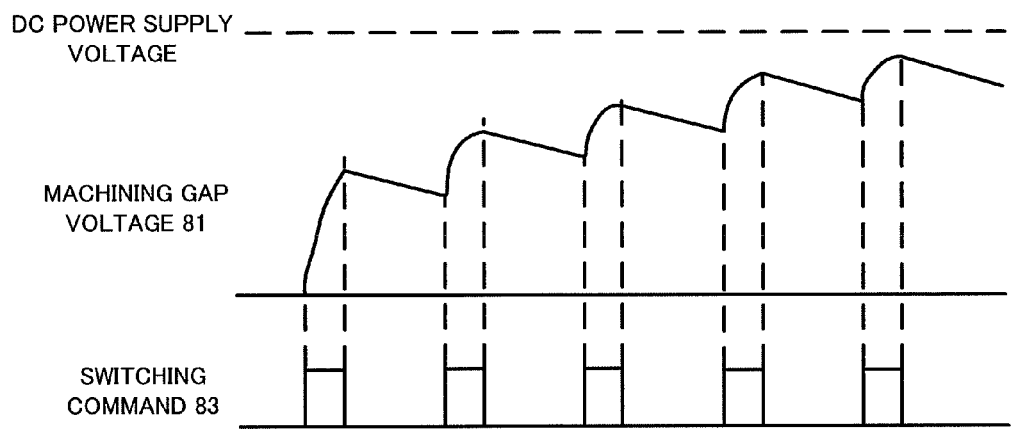
FIG. 7A shows the change in voltage waveform of the machining gap voltage in the power supply device for electric discharge machining in FIG. 6, illustrating that successive applications of voltages of the same polarity raises stepwise the machining gap voltage.
Figure 7B:
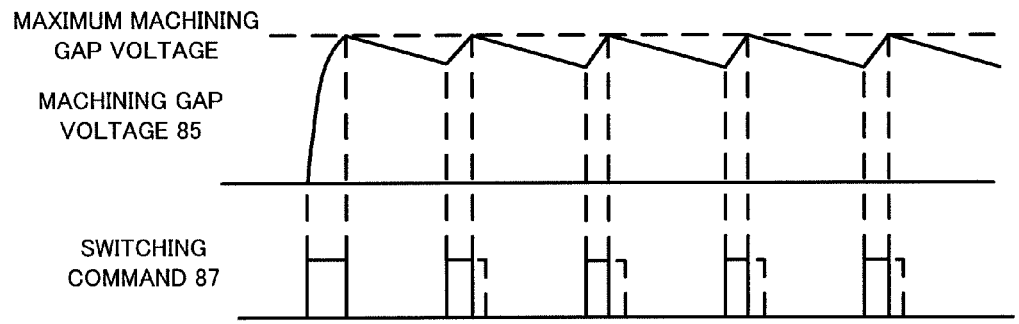
FIG. 7B shows the change in voltage waveform of the machining gap voltage in the power supply device for electric discharge machining in FIG. 6, illustrating that the waveforms of the voltages applied in individual cycles can be kept uniform by forcibly turning off the switching command when the maximum machining gap voltage is exceeded.

Referring next to FIGS. 6-7B, a second embodiment of the power supply device for electric discharge machining according to the present invention will be described.

When voltages of the same polarity are successively applied, the machining gap voltage may rise stepwise and converge to a final value, preventing individual waveforms of the applied voltages from becoming uniform, as shown in FIG. 7A. This problem does not occur in a case where each voltage application period of the voltage applying means is long enough to allow the machining gap voltage to become equal to the DC power supply voltage output from the machining power supply. Since the voltage application period is typically set to a short value to increase the electric discharge frequency, the voltage is turned off before the machining gap voltage reaches the DC power supply voltage, which causes the machining gap voltage to rise stepwise as in FIG. 7A and reach a final convergent value, which is the DC power supply voltage.

To solve this problem, in the present embodiment, a maximum machining gap voltage 93 lower than the DC power supply voltage is set in advance for each voltage value setting of the DC voltage source, as shown in FIG. 6, and the absolute value of the machining gap voltage 91 and the maximum machining gap voltage 93 are compared with each other in the comparator 97. The output from the comparator 97 is kept high while the absolute value of the machining gap voltage 91 is lower than the maximum machining gap voltage 93.

In the power supply device for electric discharge machining in FIG. 6, the output from the comparator 97 and a switching command 95 are input to the AND gate 67 (corresponding to the AND gates 67X, 67Y in the power supply device for electric discharge machining in FIG. 1). When the absolute value of the machining gap voltage 91 exceeds the maximum machining gap voltage 93, the output from the comparator 97 becomes low and is input to the AND gate 67. The output from the AND gate 67 is input to the driver circuit 69 (corresponding to the driver circuits 69X, 69Y in the power supply device for electric discharge machining in FIG. 1) and causes the driver circuit 69 to operate to forcibly turn off the switching elements in the voltage applying means.

Since the switching command is forcibly turned off when the maximum machining gap voltage is exceeded, the machining gap voltage does not exceed the maximum machining gap voltage and the waveforms of the voltages applied in individual cycles becomes identical, as shown in FIG. 7B.

Figure 8:
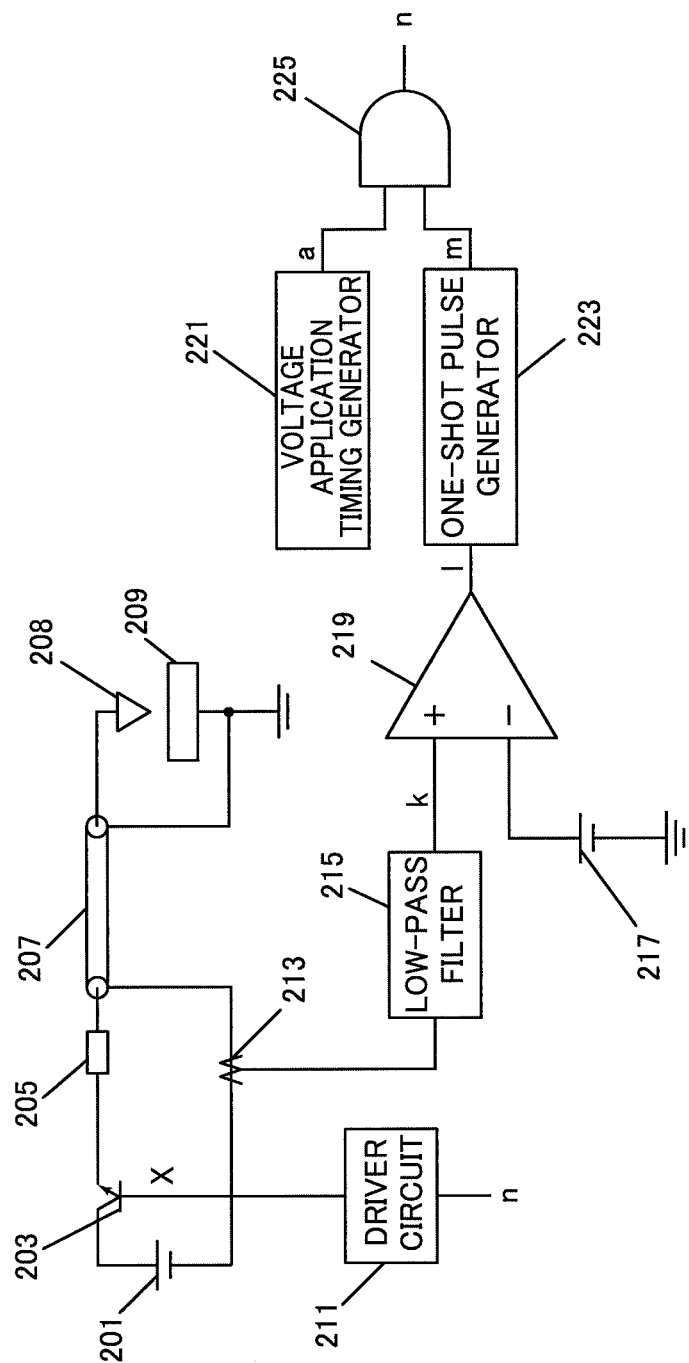
FIG. 8 shows a third embodiment of the power supply device for electric discharge machining according to the present invention.
Figure 9:
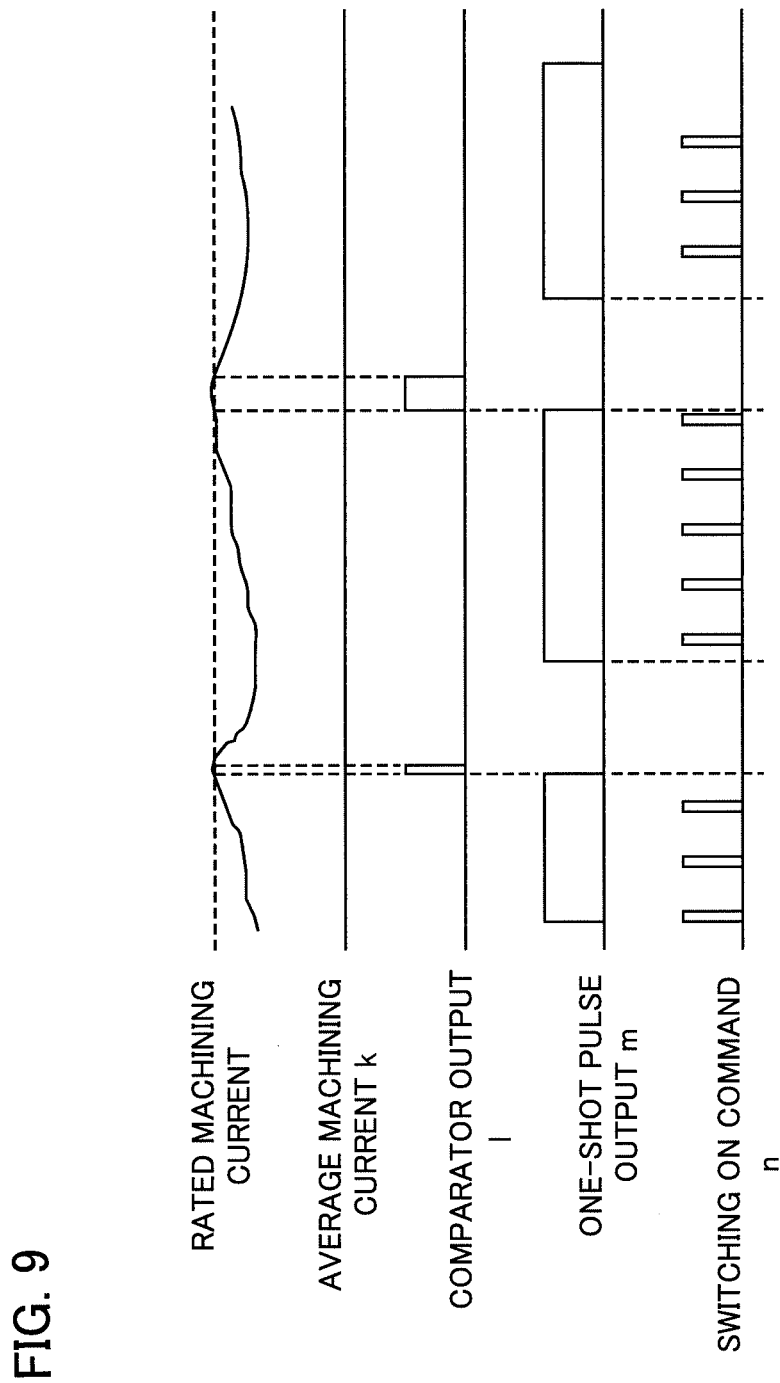
FIG. 9 is a timing chart illustrating an operation of the power supply device for electric discharge machining in FIG. 8.
Figure 11:
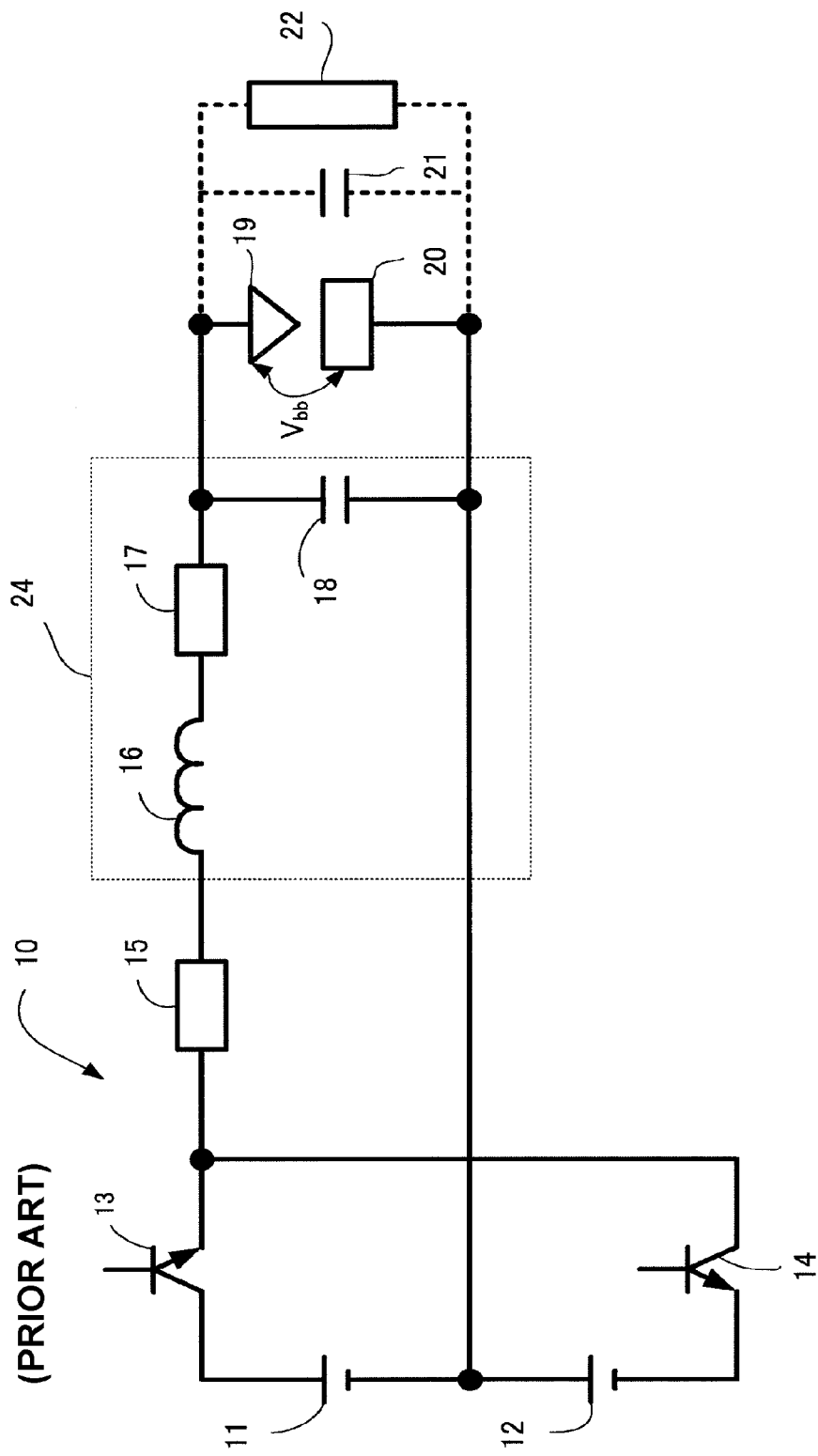
FIG. 11 is a schematic block diagram of a bipolar voltage application circuit.

Referring next to FIGS. 8 and 9, a third embodiment of the power supply device for electric discharge machining according to the present invention will be described.

Generally, the electric discharge frequency and machining current during machining are not constant but always vary depending on the machined shape and the machining state. Since the machining conditions are usually determined such that the maximum current during machining does not exceed the rated current of the power supply, some reserves remain at many places with respect to the rated current of the power supply. Accordingly, if voltage application is temporarily stopped when the machining current reaches the rated current of the power supply, machining can be performed constantly at the rated current, which substantially enhances the machining capability.

Referring now to FIGS. 8 and 9, the configuration and operation of the power supply device in this embodiment will be described more specifically. Although only the circuit on the positive polarity side is shown in these figures, the circuit on the negative polarity side can be controlled in the same way.

An average machining current k is determined by measuring the machining current with a current detector 213 and passing the measured signal through a low-pass filter 215. The average machining current k and the rated machining current 217, which is preset in the machining power supply circuit, are compared with each other in the comparator 219. When the average machining current k exceeds the rated machining current 217, the output l from the comparator reverses and triggers a one-shot pulse generator 223. The output m from the one-shot pulse generator 223 is normally high, but with the trigger input, the output m from the one-shot pulse generator 223 stays low for a predetermine time period. Logic operation AND of the output m from the one-shot pulse generator 223 and a switching-on command a from the voltage application timing generator 221 are executed in the AND gate, so that the voltage application across the machining gap can temporarily be stopped. Here, the output from the AND gate 67X in FIG. 1 becomes the output from the voltage application timing generator 221 in FIG. 8. This can prevent the output current from the voltage application circuit from exceeding the rated current.

The invention claimed is:

1. A power supply device for electric discharge machining, the power supply device comprising:
    a voltage applying circuit configured to apply positive and negative voltages across a machining gap between an electrode and a workpiece in a plurality of voltage application periods each being not longer than one microsecond, wherein a quiescent period equal to or longer than each of the plurality of voltage application periods is provided between successive voltage application periods among the plurality of voltage application periods;
    a machining-gap open-state determining circuit configured to determine whether the machining gap between the electrode and the workpiece is in open state or not before each of the plurality of voltage application periods;
    an average voltage detecting circuit configured to detect an average machining gap voltage during machining, the average machining gap voltage being an average value of the voltages applied across the machining gap over a period from a preset reference time to a present time;
    an open-state counting circuit configured to count a number of successive machining gap open states having the same polarity detected by the machining-gap open-state determining circuit; and
    an applied polarity determining circuit configured to determine polarities of the voltages to be applied across the machining gap based on
        a result of determination by the machining-gap open-state determining circuit,
        the average machining gap voltage detected by the average voltage detecting circuit, and
        the number of successive machining gap open states counted by the open-state counting circuit,
    wherein, when the machining gap is in open state before a voltage application period among the plurality of voltage application periods,
        the applied polarity determining circuit is configured to compare a preset maximum number of successive open states with the number of successive machining gap open states counted by the open-state counting circuit,
        when the number of successive machining gap open states counted by the open-state counting circuit does not reach the maximum number of successive open states, the applied polarity determining circuit is configured to apply, across the machining gap, a voltage of the same polarity as a voltage applied in a last voltage application period among the plurality of voltage application periods, and
        when the number of successive machining gap open states counted by the open-state counting circuit reaches the maximum number of successive open states, the applied polarity determining circuit is configured to apply a voltage of a polarity opposite to the voltage applied in the last voltage application period.

2. The power supply device for electric discharge machining according to claim 1, wherein
    when the machining gap is not in open state before a voltage application period among the plurality of voltage application periods,
        when the average machining gap voltage detected by the average voltage detecting circuit has a positive polarity, the applied polarity determining circuit is configured to determine that a voltage of a negative polarity is to be applied next, and
        when the average machining gap voltage detected by the average voltage detecting circuit has a negative polarity, the applied polarity determining circuit is configured to determine that a voltage of a positive polarity is to be applied next.

3. The power supply device for electric discharge machining according to claim 1,
    wherein, when an absolute value of a voltage applied across the machining gap between the electrode and the workpiece exceeds a preset maximum voltage, voltage application is inhibited.

4. The power supply device for electric discharge machining according to claim 1,
    wherein, when an average value of currents output from the voltage applying circuit during machining over a period from the preset reference time to the present time exceeds a preset maximum current, voltage application is suspended and is resumed after a predetermined quiescent period.

5. The power supply device for electric discharge machining according to claim 1, wherein
    the voltage applying circuit comprises a flip-flop circuit and a driver circuit,
    the machining-gap open-state determining circuit comprises a comparator configured to receive an open-state determining voltage,
    the open-state counting circuit comprises a preset counter, and
    the applied polarity determining circuit comprises an OR circuit configured to
        receive an output of the preset counter and an output of the comparator, and
        output a result of determination to the flip-flop circuit.

6. The power supply device for electric discharge machining according to claim 5, further comprising:
    an average machining current detector configured to measure a machining current during machining;
    a comparator configured to compare the machining current and a rated machining current; and
    a pulse generator connected to an output of the comparator and configured to output a signal to the driver circuit, wherein said signal temporarily stops voltage application across the machining gap.

7. A method of supplying power for electric discharge machining, the power supplying method comprising:
    applying positive and negative voltages across a machining gap between an electrode and a workpiece in a plurality of voltage application periods each being not longer than one microsecond, wherein a quiescent period equal to or longer than each of the plurality of voltage application periods is provided between successive voltage application periods among the plurality of voltage application periods;

determining whether the machining gap between the electrode and the workpiece is in open state or not before each of the plurality of voltage application periods;

detecting an average machining gap voltage during machining, the average machining gap voltage being an average value of the voltages applied across the machining gap over a period from a preset reference time to a present time;

counting a number of successive machining gap open states having the same polarity detected by the determining;

determining polarities of the voltages to be applied across the machining gap based on
- a result of determination by the machining-gap open-state determining circuit,
- the average machining gap voltage detected by the average voltage detecting circuit, and
- the number of successive machining gap open states counted by the open-state counting circuit, and when the number of successive machining gap open state before voltage application, comparing a preset maximum number of successive open states with the value counted by the counting and, when the counted value does not reach the maximum number of successive open states, applying, across the matching gap, a voltage of the same polarity as a voltage applied in a last voltage application period among the plurality of voltage application periods, and when the value counted by the counting reaches the maximum number of successive open states, applying a voltage of a polarity opposite to the voltage applied in the last voltage application period.

8. The method according to claim 7, further comprising when the machining gap is not in open state before voltage application, determining application of a negative polarity as the polarity to be applied next when a positive polarity is detected, and determining application of a positive polarity as the polarity to be applied next when a negative polarity is detected.

9. The method according to claim 7, further comprising inhibiting voltage application when an absolute value of a voltage applied across the machining gap between the electrode and the workpiece exceeds a preset maximum voltage.

10. The method according to claim 7, further comprising suspending voltage application and resuming after a predetermined quiescent period when an average value of the currents during machining over a period from the preset reference time to the present time exceeds a preset maximum current.

* * * * *